US009862319B2

(12) United States Patent
Miyoshi et al.

(10) Patent No.: US 9,862,319 B2
(45) Date of Patent: *Jan. 9, 2018

(54) VEHICLE PERIPHERAL OBSERVATION DEVICE USING CAMERAS AND AN EMPHASIZED FRAME

(71) Applicant: AISIN SEIKI KABUSHIKI KAISHA, Aichi-ken (JP)

(72) Inventors: Hidehiko Miyoshi, Kariya (JP); Noboru Nagamine, Anjo (JP); Kenji Miura, Chiryu (JP); Kinji Yamamoto, Anjo (JP); Kenjiro Goto, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,096

(22) Filed: Mar. 10, 2016

(65) Prior Publication Data
US 2016/0185294 A1    Jun. 30, 2016

Related U.S. Application Data

(63) Continuation of application No. 13/636,080, filed as application No. PCT/JP2011/052135 on Feb. 2, 2011, now Pat. No. 9,403,481.

(30) Foreign Application Priority Data

Mar. 26, 2010 (JP) .................. 2010-072325

(51) Int. Cl.
B60R 1/00      (2006.01)
H04N 7/18      (2006.01)
(Continued)

(52) U.S. Cl.
CPC .............. B60R 1/00 (2013.01); B60R 11/04 (2013.01); G06K 9/00805 (2013.01); G06T 3/40 (2013.01);
(Continued)

(58) Field of Classification Search
CPC ..... B60R 1/00; B60R 11/04; B60R 2300/105; B60R 2300/602; B60R 2300/301; H04N 7/181; G06K 9/00805
See application file for complete search history.

(56) References Cited

U.S. PATENT DOCUMENTS 7,432,799 B2    10/2008  Tsuboi
7,720,375 B2    5/2010   Aoki et al.
(Continued)

FOREIGN PATENT DOCUMENTS

CN    101041342    9/2007
CN    101269644    9/2008
(Continued)

OTHER PUBLICATIONS

Chinese Office Action dated Oct. 8, 2014 in Chinese Patent Application No. 201180014522.1.
(Continued)

Primary Examiner — Jay Patel
Assistant Examiner — Joseph Suh
(74) Attorney, Agent, or Firm — Sughrue Mion, PLLC

(57) ABSTRACT

Provided is a device whereby the position of an obstacle can be perceived on a monitor without compromising the effectiveness of displaying an overhead image on the monitor. An overhead image generating unit generates an overhead image from images captured using plural cameras, and the overhead image is displayed in an auxiliary display area of a monitor. When an obstacle detection part detects an obstacle in proximity to a vehicle, a specified information
(Continued)

output unit emphasizes the display of a frame in the outer side of a divided area of the overhead image that contains the obstacle. Touching the auxiliary display area with a finger or the like during this emphasized display causes the captured image of the obstacle to be enlarged and displayed in the auxiliary display area.

3 Claims, 8 Drawing Sheets

(51) Int. Cl.
  *B60R 11/04* (2006.01)
  *G06K 9/00* (2006.01)
  *G06T 3/40* (2006.01)
  *G06T 11/00* (2006.01)
(52) U.S. Cl.
  CPC ............... *G06T 11/00* (2013.01); *H04N 7/18* (2013.01); *H04N 7/181* (2013.01); *B60R 2300/105* (2013.01); *B60R 2300/301* (2013.01); *B60R 2300/303* (2013.01); *B60R 2300/305* (2013.01); *B60R 2300/307* (2013.01); *B60R 2300/602* (2013.01); *B60R 2300/607* (2013.01); *B60R 2300/806* (2013.01); *B60R 2300/8093* (2013.01)

(56) References Cited

U.S. PATENT DOCUMENTS

| | | | | |
|---|---|---|---|---|
| 2001/0035875 A1* | 11/2001 | Suzuki | ................ | G06T 11/60 715/723 |
| 2001/0040534 A1* | 11/2001 | Ohkawara | ................ | G09G 5/00 345/7 |
| 2002/0003571 A1* | 1/2002 | Schofield | ................ | B60C 23/00 348/148 |
| 2003/0058238 A1 | 3/2003 | Doak et al. | | |
| 2003/0112354 A1* | 6/2003 | Ortiz | ................ | H04N 7/18 348/333.01 |
| 2003/0179293 A1* | 9/2003 | Oizumi | ................ | B60R 1/00 348/148 |
| 2004/0105579 A1* | 6/2004 | Ishii | ................ | B60R 1/00 382/154 |
| 2004/0246534 A1* | 12/2004 | Higuchi | ................ | G11B 27/002 358/474 |
| 2005/0091626 A1* | 4/2005 | Okano | ................ | G06F 17/5068 716/139 |
| 2005/0276448 A1 | 12/2005 | Pryor | | |
| 2006/0119472 A1 | 6/2006 | Tsuboi | | |
| 2006/0192660 A1* | 8/2006 | Watanabe | ................ | B60R 1/00 340/435 |
| 2006/0287826 A1* | 12/2006 | Shimizu | ................ | B60K 35/00 701/431 |
| 2007/0003108 A1 | 1/2007 | Chinomi et al. | | |
| 2007/0063997 A1 | 3/2007 | Scherer et al. | | |
| 2007/0182528 A1* | 8/2007 | Breed | ................ | B60Q 9/008 340/435 |
| 2007/0222797 A1* | 9/2007 | Misawa | ................ | G01C 21/20 345/629 |
| 2008/0122654 A1* | 5/2008 | Sakakibara | ............ | G08G 1/168 340/932.2 |
| 2008/0180438 A1* | 7/2008 | Sasaki | ................ | A63F 13/10 345/420 |
| 2008/0231702 A1 | 9/2008 | Matsumoto et al. | | |
| 2008/0231740 A1* | 9/2008 | McIntyre | ............ | H04N 5/2251 348/333.01 |
| 2009/0009533 A1* | 1/2009 | Kudo | ................ | G09B 29/106 345/660 |
| 2009/0073271 A1* | 3/2009 | Grenlund | ............ | H04N 5/2251 348/211.8 |
| 2009/0140881 A1* | 6/2009 | Sakai | ................ | G08G 1/164 340/901 |
| 2009/0201314 A1* | 8/2009 | Tanaka | ................ | H04N 5/4403 345/629 |
| 2009/0257659 A1* | 10/2009 | Suzuki | ................ | B60R 1/00 382/199 |
| 2009/0267801 A1* | 10/2009 | Kawai | ................ | G08G 1/04 340/988 |
| 2009/0278766 A1* | 11/2009 | Sako | ................ | G02B 27/017 345/8 |
| 2009/0305682 A1* | 12/2009 | Spalink | ............ | G06F 17/30905 455/414.3 |
| 2009/0327940 A1* | 12/2009 | Duncan | ................ | G06F 3/048 715/765 |
| 2010/0067740 A1* | 3/2010 | Hayasaka | .......... | G06K 9/00362 382/103 |
| 2010/0090880 A1* | 4/2010 | Aiga | ................ | G01S 13/931 342/27 |
| 2010/0194596 A1* | 8/2010 | Wang | ................ | B60R 1/00 340/936 |
| 2010/0232704 A1* | 9/2010 | Thorn | ................ | G06F 3/04845 382/195 |
| 2010/0253540 A1* | 10/2010 | Seder | ................ | B60R 1/00 340/905 |
| 2011/0043632 A1 | 2/2011 | Satoh | | |
| 2011/0122085 A1* | 5/2011 | Chang | ................ | G06F 1/1626 345/174 |
| 2011/0145068 A1* | 6/2011 | King | ................ | G06F 17/211 705/14.55 |
| 2011/0169955 A1 | 7/2011 | Watanabe et al. | | |
| 2011/0228980 A1* | 9/2011 | Ichikawa | ............ | H04N 7/181 382/103 |
| 2012/0274737 A1* | 11/2012 | Kuboyama | ............ | B60R 1/00 348/36 |
| 2013/0010117 A1* | 1/2013 | Miyoshi | ................ | B60R 1/00 348/148 |

FOREIGN PATENT DOCUMENTS

| | | |
|---|---|---|
| DE | 10 2008 046 214 A1 | 4/2009 |
| EP | 1 725 035 A1 | 11/2006 |
| EP | 2 150 054 A1 | 2/2010 |
| JP | 2002-19556 A | 1/2002 |
| JP | 2006-131166 A | 5/2006 |
| JP | 2006-252389 A | 9/2006 |
| JP | 2006-273190 A | 10/2006 |
| JP | 2007-235529 A | 9/2007 |
| JP | 2008-254710 A | 10/2008 |
| JP | 2008-301091 A | 12/2008 |
| JP | 2009-239674 A | 10/2009 |

OTHER PUBLICATIONS

English Translation of International Preliminary Report on Patentability for PCT/JP2011/052135 dated Nov. 1, 2012.
International Search Report and Written Opinion for PCT/JP2011/052135 dated Apr. 12, 2011.
Communication dated Nov. 7, 2016 from the European Patent Office in counterpart Application No. 11759068.7.

* cited by examiner

VEHICLE PERIPHERAL OBSERVATION DEVICE USING CAMERAS AND AN EMPHASIZED FRAME

CROSS-REFERENCE TO RELATED APPLICATIONS

This application is a continuation of U.S. patent application Ser. No. 13/636,080, filed Sep. 19, 2012, which is a 371 National Stage entry of PCT/JP2011/052135, filed Feb. 2, 2011, which claims benefit to Japanese Patent Application No. 2010-0723235, filed Mar. 26, 2010. The entire disclosures of the prior applications are considered part of the disclosure of the accompanying continuation application, and are hereby incorporated by reference.

TECHNICAL FIELD

The present invention relates to a vehicle peripheral observation device, and more specifically relates to a technique for displaying an image captured by a camera on a monitor and enabling a driver to recognize an obstacle from the captured image displayed on the monitor.

BACKGROUND ART

As a vehicle peripheral observation device configured as described above, Patent Document 1 discloses a processing format in which an overhead image of the vehicle periphery is generated from images captured using a plurality of cameras and displayed on a monitor (the display in the document), the overhead image divides the peripheral area of the vehicle into a plurality of areas, and when a user selects any of these areas with a touch panel, an overhead image of the selected area is enlarged and displayed on the monitor.

Patent Document 1 also discloses that the area displaying the overhead image and the area displaying the enlarged image in the monitor are set separately, and it is possible to make a selection for the enlarged image between a mode of enlarging the overhead image and a mode of enlarging the image captured using the camera that images the selected area (the camera-view image).

As a vehicle peripheral observation device configured as described above, Patent Document 2 discloses a processing format in which an overhead image of the vehicle periphery is generated from images captured using a plurality of cameras and displayed on a monitor (the display device in the document), and when an obstacle is detected by an obstacle sensor provided to the vehicle, an image including part of the vehicle and the obstacle is extracted to generate a caution image, and the caution image is displayed in a position in the overhead image equivalent to the position of the obstacle.

PRIOR ART DOCUMENTS

Patent Documents

[Patent Document 1] Japanese Laid-open Patent Application No. 2009-239674
[Patent Document 2] Japanese Laid-open Patent Application No. 2006-131166

DISCLOSURE OF THE INVENTION

Problems that the Invention is Intended to Solve

When the vehicle is moved to a parking position or when the vehicle traverses a road surface in which an obstacle or a parked vehicle is present, the positional relationship between the vehicle and the obstacle or the like in the vehicle's proximity must be confirmed. In the techniques disclosed in Patent Document 1 and Patent Document 2, the conditions of all areas of the vehicle periphery, including areas in the driver's blind spot, can be perceived from the overhead image.

However, when an obstacle is displayed on the monitor during an overhead display, the obstacle is difficult to visually confirm because of its small display size, and it is also difficult to perceive the gap between the vehicle and the obstacle, leaving room for improvement.

As a countermeasure to this inconvenience, in the technique disclosed in Patent Document 1, the area indicated by the driver is enlarged and displayed on the monitor, and factors such as the positional relationship between the obstacle and the vehicle body can be easily confirmed by the enlarged image. However, because the plurality of areas displayed on the monitor are comparatively small in size, and moreover, because there must be an operation for the driver to select and indicate the area containing the obstacle from the plurality of areas, it can be troublesome and there is room for improvement.

In Patent Document 2, when an obstacle is detected, a new window is automatically opened to display the obstacle in the area containing the obstacle, and the positional relationship between the obstacle and the vehicle body can be perceived from the display of this window. However, when the driver already perceives the positional relationship of the obstacle, the window display sometimes causes an inconvenience in that the nearby road surface or the like is covered by the window and the road surface conditions cannot be visually confirmed.

An object of the present invention is to rationally configure a device whereby the position of an obstacle can be perceived without compromising the effectiveness of displaying an overhead image on the monitor.

Means for Solving the Problems

The present invention comprises a plurality of cameras for imaging areas including a road surface of a vehicle periphery, an image processor for displaying the images captured using the plurality of cameras on a monitor, and obstacle-detecting means for detecting an obstacle in the vehicle periphery;

the image processor having overhead-image-generating means for generating an overhead image looking down on the vehicle periphery from above from the images captured using the plurality of cameras and displaying the resulting image in an overhead image display area of the monitor, the overhead image display area being divided and managed as a plurality of divided areas, and specified information output unit that, when an obstacle is detected by the obstacle-detecting unit, emphasizes the display of a frame in the outer periphery of the divided area containing the obstacle detected by the obstacle-detecting unit from among the plurality of divided areas, and displaying the position of the detected obstacle on the monitor.

According to this configuration, when an overhead image is displayed on the monitor and an obstacle is detected by the obstacle-detecting unit, the display of the frame in the outer periphery of the divided area containing the obstacle is emphasized by the specified information output unit. This emphasized display enables the area containing the obstacle to be perceived from among the plurality of divided areas.

As a result, the device is configured in a manner such that the position of the obstacle can be perceived without compromising the effectiveness of displaying an overhead image on the monitor.

In the present invention, the emphasized display may be either an increase in the brightness of the frame or a switching of the frame to a different hue.

According to this configuration, increasing the brightness of the frame or switching the hue of the frame makes it possible to easily specify the divided area to which the frame corresponds.

In the present invention, the monitor may have a touch panel in the display surface, and may also have enlarged display unit for enlarging to the size of the enlarged display area, in a state where the emphasized display is being performed, the display of an image of the divided area in the monitor where the emphasized display is being performed when touching of the overhead image display area is sensed in the touch panel during the emphasized display.

According to this configuration, even without an operation of selecting a divided screen and touching with a finger, an image including the obstacle can be enlarged to the size of the enlarged display area merely by touching a finger or the like to the overhead image display area, and the obstacle can be confirmed.

In the present invention, the enlarged display unit may perform a process of setting the overhead image displayed in the divided area where the emphasized display is performed as an image to be enlarged, setting an enlarged display area in which the image to be enlarged is displayed as enlarged, generating a plurality of intermediate images in which the image to be enlarged will be an intermediate size between the size of the divided area and the size of the enlarged display area, and sequentially displaying the intermediate images beginning with the smallest size.

According to this configuration, the area containing the obstacle can be perceived visually due to the overhead image of the divided area being enlarged. An overhead image of the same size as the divided area is displayed as being enlarged gradually up to the size of the enlarged display area, it being simple to perceive which divided area's overhead image has been enlarged.

In the present invention, the enlarged display unit may perform a process of setting the image captured using the camera that has imaged the emphasized-display divided area as an image to be enlarged, setting an enlarged display area in which the image to be enlarged is displayed as enlarged, generating a plurality of intermediate images in which the image to be enlarged will be an intermediate size between the size of the divided area and the size of the enlarged display area, and sequentially displaying the intermediate images beginning with the smallest size.

According to this configuration, the area containing the obstacle can be perceived visually as seen from the camera's viewpoint, due to the enlarging of the image captured using the camera that images the area containing the obstacle. A captured image of the same size as the divided area is displayed as being enlarged gradually up to the size of the enlarged display area, and which divided area the enlarged captured image corresponds to can be easily perceived.

In the present invention, the enlarged display unit may display the overhead image in the overhead image display area instead of the enlarged display produced by the enlarged display unit when the obstacle-detecting unit has switched to a state of not detecting obstacles.

According to this configuration, when the vehicle body has completely passed through the area containing the obstacle, the original overhead image is then displayed in the overhead image display area, and a state of perceiving the entire state of the vehicle periphery is resumed without any manual operation.

BEST MODE FOR CARRYING OUT THE INVENTION

An embodiment of the present invention will be described below with reference to the accompanying drawings.

In the present embodiment, provided is a vehicle peripheral observation device for generating an overhead image in the format of looking down on the periphery of a vehicle 1 from above from images captured using a plurality of cameras provided to the vehicle 1, and displaying the overhead image on a monitor 21. Particularly, when the vehicle peripheral observation device detects an obstacle X in the vicinity of the vehicle, the overhead image displayed on the monitor 21 is divided into a plurality of parts, divided areas D1 to D4 are set, an emphasis display is performed for specifying the divided areas D1 to D4 including the obstacle X, and control is executed for displaying an enlarged image of the area containing the obstacle X on the monitor 21 (hereinbelow referred to as an enlarge process). The format and configuration of such control are described hereinbelow.

[Basic Configuration]

Figure 1:
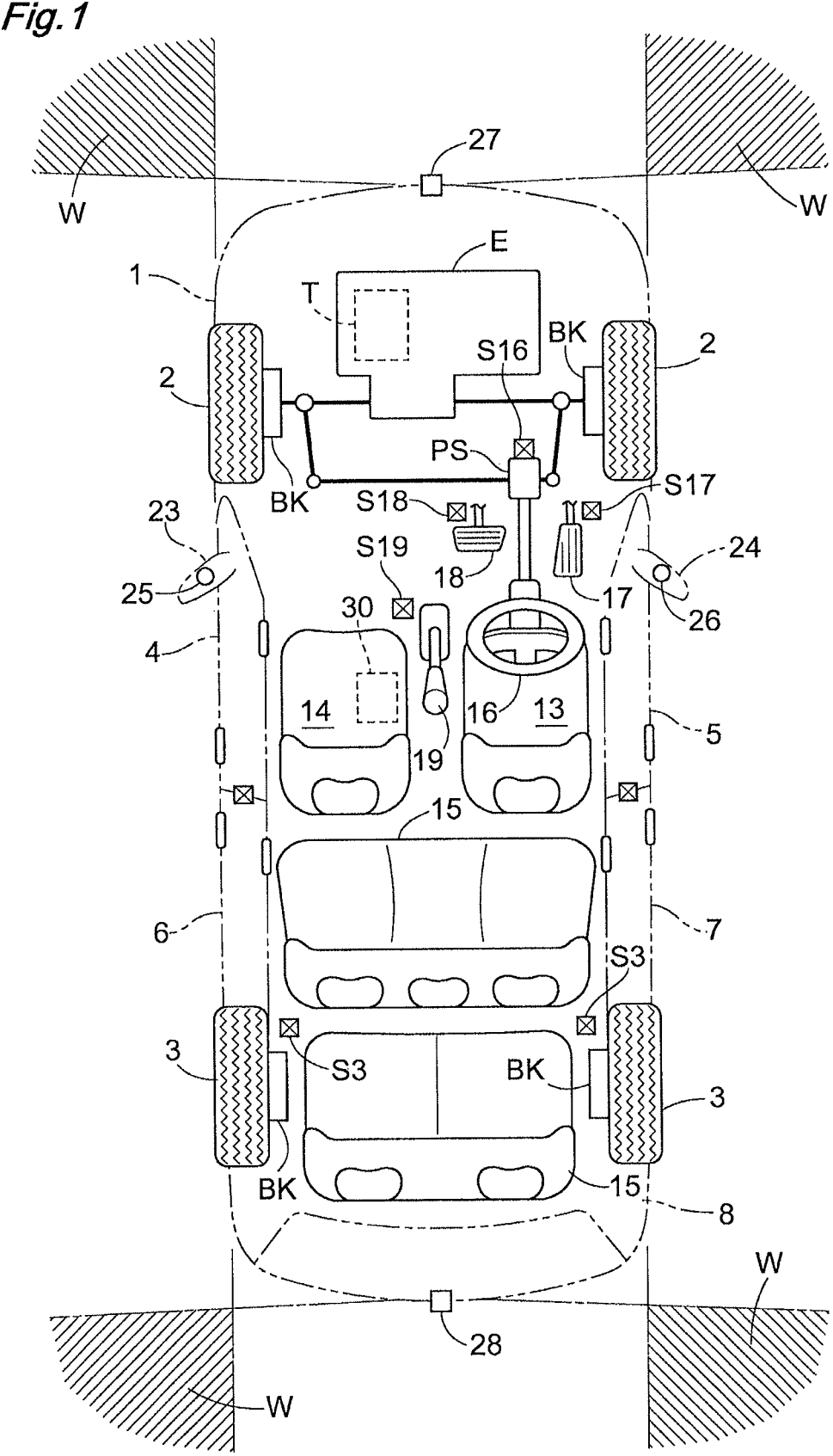
FIG. 1 is a plan view showing an overview of the configuration of the vehicle.
Figure 2:
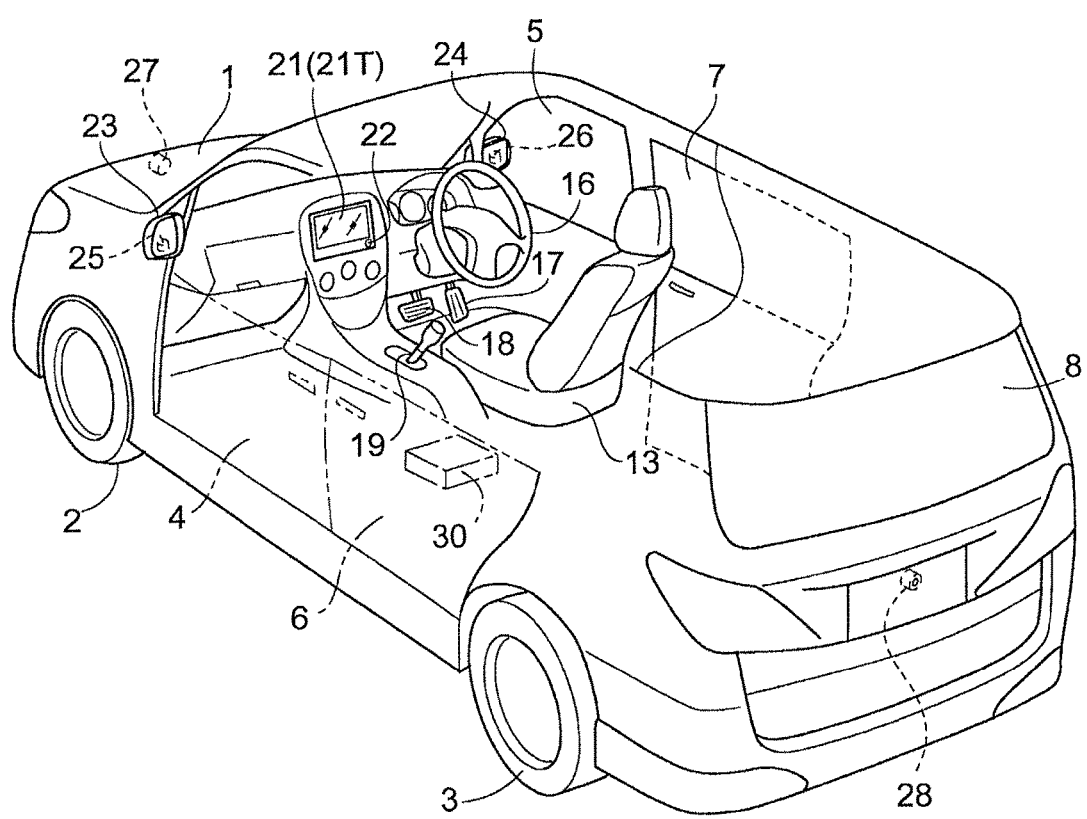
FIG. 2 is a partially cutaway perspective view showing the configuration of the vehicle.

The vehicle 1 as a passenger vehicle comprises left and right front wheels 2 and left and right rear wheels 3, as shown in FIGS. 1 and 2. A left front door 4 and a right front door 5 that can open and close by hinges are provided to positions in the front of the vehicle 1, a left rear door 6 and a right rear door 7 that can open and close in a sliding manner are provided to positions in the rear of the vehicle 1, and a hatchback type back door 8 is provided in the rear end of the vehicle 1.

A driver seat 13, a passenger seat 14, and a plurality of rear seats 15 are provided inside the interior of the vehicle 1. A steering wheel 16 is provided in a position in front of the driver seat 13, and a panel having gauges is disposed in the front part of the steering wheel. At the foot of the driver seat 13 are disposed an acceleration pedal 17 and a brake pedal 18 for operating braking devices BK of the front wheels 2 and rear wheels 3 and exerting braking force on the front wheels 2 and rear wheels 3, and a shift lever 19 for implementing a speed change is disposed in the side of the driver seat 13.

The monitor 21, which has a touch panel 21T formed in a surface display, is provided in proximity to the driver seat 13 and in a position in the top part of a console. The monitor 21 is a liquid crystal device having a backlight. As shall be apparent, the monitor may also use a plasma display or a CRT. The touch panel 21T is configured as a pressure-sensitive or electrostatic command input device for outputting the contact position of a finger or the like as location data. The housing 21H of the monitor 21 is also provided with a speaker 22, but the speaker 22 may also be provided in another location such as the inner side of a door. The monitor 21 can also serve as a display device of a navigation system, but a monitor that is used solely for a vehicle peripheral observation display may also be used.

The left front door 4 is provided with a left side mirror 23, and the right front door 5 is provided with a right side mirror 24. The left side mirror 23 is provided with a left side camera 25, and the right side mirror 24 is provided with a right side camera 26. The front end of the vehicle 1 is provided with a front camera 27, and the rear end of the vehicle 1 is provided with a rear camera 28.

Particularly, the imaging directions of the left side camera 25 and right side camera 26 are oriented downward, and part of the vehicle 1 and the road surface are included in the imaging area. The imaging directions of the front camera 27 and rear camera 28 are oriented at a downward slant, and part of the vehicle 1 and the road surface are included in the imaging area.

These cameras, used as imaging devices, are digital cameras equipped with charge coupled devices (CODs), CMOS image sensors (CISs), or other imaging elements, and the cameras output imaged information as video information in real time. The cameras are ensured a wide field of vision by being provided with wide-angle lenses.

The monitor 21 is used to display navigation information during navigation mode control, but images captured by the rear camera 28 are displayed when the shift lever 19 has been operated to the reverse position. Particularly, the image captured by the rear camera 28 is an image in which left and right are interchanged by left-right mirror reflection, and the content displayed in the monitor 21 can be visually confirmed with the same sensation as that of using the rearview mirror to confirm the rearward view.

The front part of the vehicle is provided with a power steering unit PS for transmitting the rotational operation force of the steering wheel 16 to the front wheels 2 and performing drive steering. The front part of the vehicle is also provided with an engine E, and a speed change mechanism T consisting of a torque converter, a CVT, or the like for changing the speed of motive power from the engine E and transmitting it to the front wheels 2. Switching between forward and reverse and changing the travel speed of the speed change mechanism T are performed by operating the shift lever 19.

The vehicle 1 is provided with various sensors for detecting the driving operation and the movement state of the vehicle 1. More specifically, the operating system of the steering wheel 16 is provided with a steering sensor S16 for measuring the steering operation direction (the steering direction) and the operated amount (steered amount). The operating system of the shift lever 19 is provided with a shift position sensor S19 for distinguishing the shift position. The operating system of the acceleration pedal 17 is provided with an acceleration sensor S17 for measuring the operated amount, and the operating system of the brake pedal 18 is provided with a brake sensor S18 for detecting whether or not the brake pedal is being operated.

In the proximity of the rear wheels 3, there is provided a photo interrupter or pickup type movement distance sensor S3 so as to measure the movement amount of the vehicle 1 from the rotation amount of the rear wheels 3. The movement distance sensor S3 may be one that acquires the movement amount from the rotation amount of the transmission system inside the speed change mechanism T. The movement distance sensor S3 may measure the rotation amount of the front wheels 2. Furthermore, the movement distance sensor S3 may be configured so as to detect the movement amount and steering amount of the vehicle 1 from image processing of the captured image of the front camera 27 or the rear camera 28.

[Control Configuration]

Figure 3:
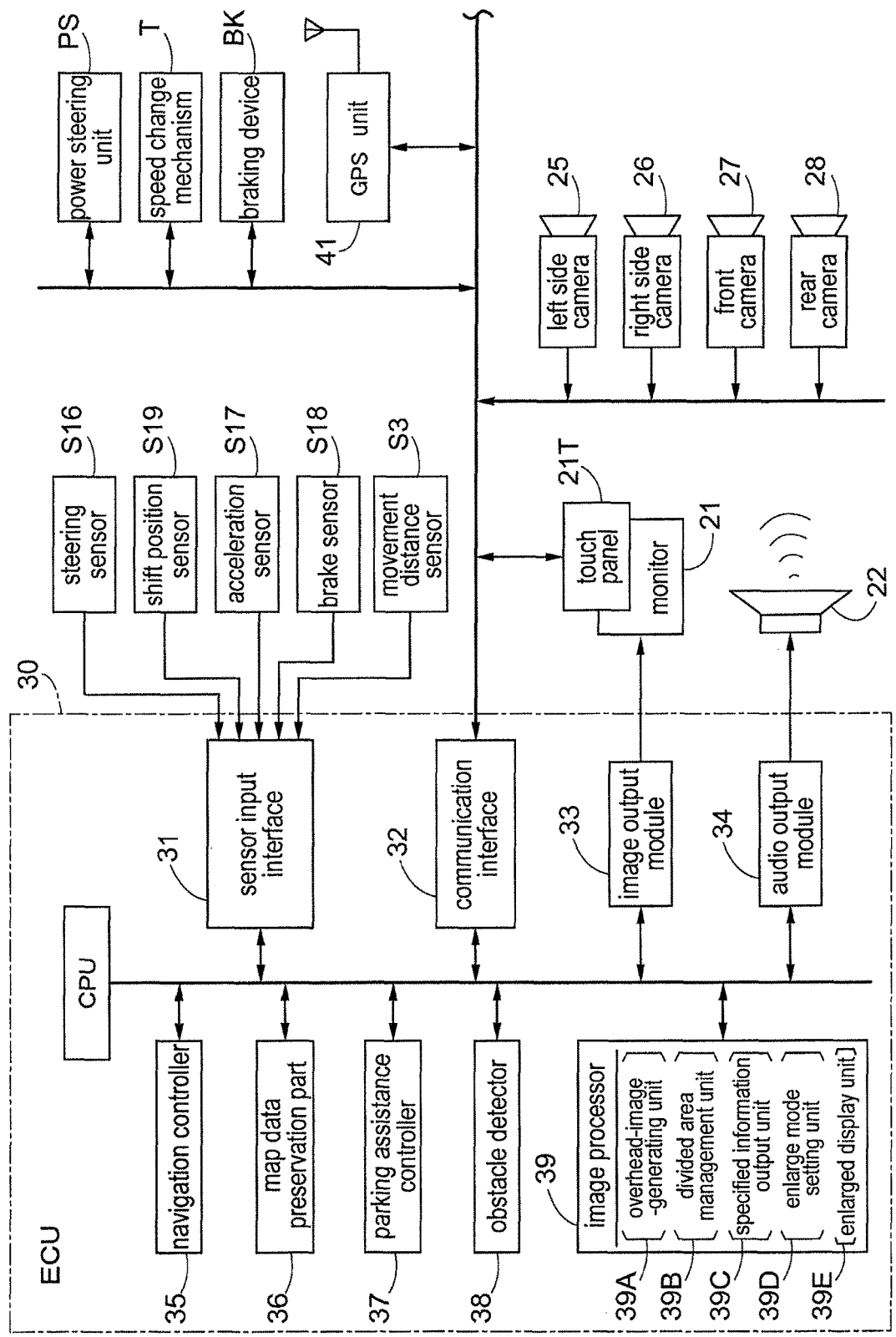
FIG. 3 is a block circuit diagram of the control system.

An ECU 30 as the vehicle peripheral observation device of the present invention is disposed in the middle of the vehicle 1. The ECU 30 comprises an interface consisting of a sensor input interface 31 and a communication interface 32, and also comprises an image output module 33 and an audio output module 34, as shown in FIG. 3.

The ECU 30 comprises a microprocessor, a digital signal processor (DSP), or another processing system for processing information obtained via the interface, the processing results are outputted from the image output module 33 to the monitor 21, and audio information is outputted from the audio output module 34 to the speaker 22.

The ECU 30 comprises a navigation controller 35 for implementing navigation mode control, a map data preservation part 36 for sending map information to the navigation controller 35, a parking assistance controller 37 for implementing parking assistance mode control, an obstacle detector 38 (an example of the obstacle-detecting unit) for sensing an obstacle X in the proximity of the vehicle, and an image processor 39 for implementing vehicle peripheral observation processing.

The navigation controller 35 acquires the vehicle position indicated by latitude information and longitude information from a GPS unit 41 during travel, acquires map data corresponding to the vehicle position, and displays the position and data on the monitor 21. The navigation information leading to the destination is displayed on the monitor 21, and leading information is outputted in audio from the speaker 22. The map data preservation part 36 performs a process of sending the map data corresponding to the vehicle position to the navigation controller 35.

Figure 6:
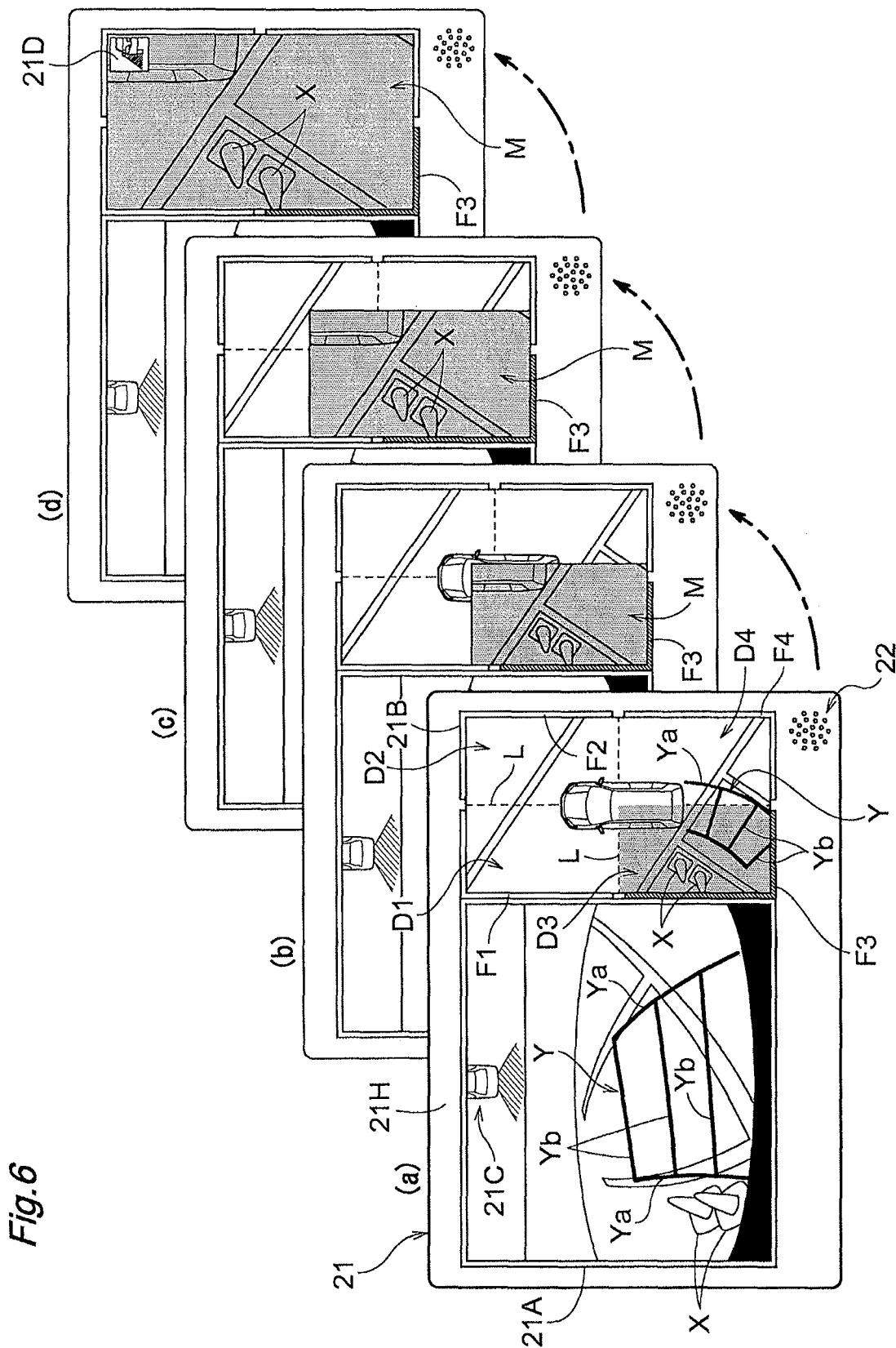
FIG. 6 is a continuous depiction of the process of enlarging the overhead image of a divided area to the auxiliary display area.
Figure 7:
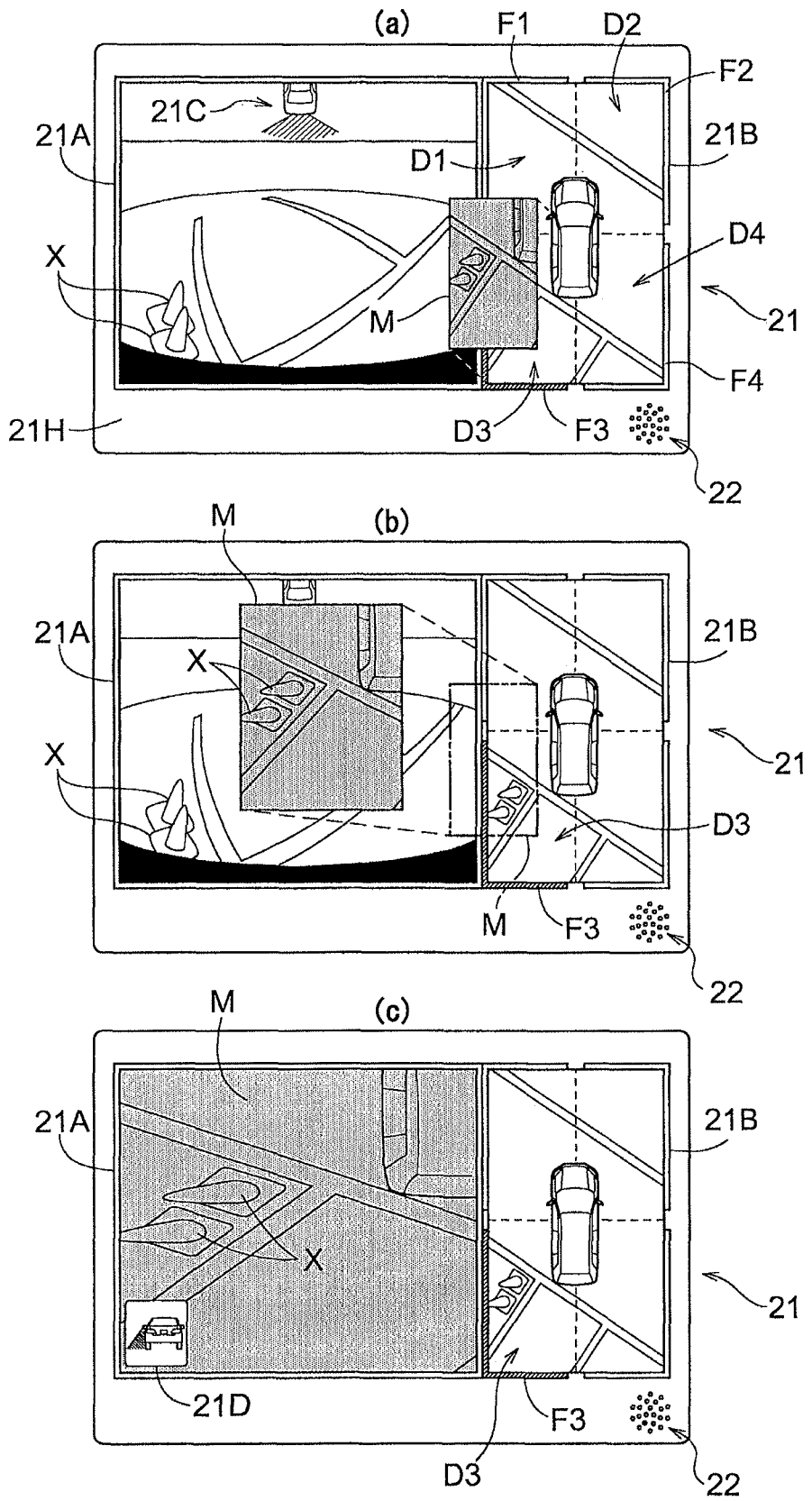
FIG. 7 is a continuous depiction of the process of enlarging the overhead image of a divided area to the primary display area.
Figure 8:
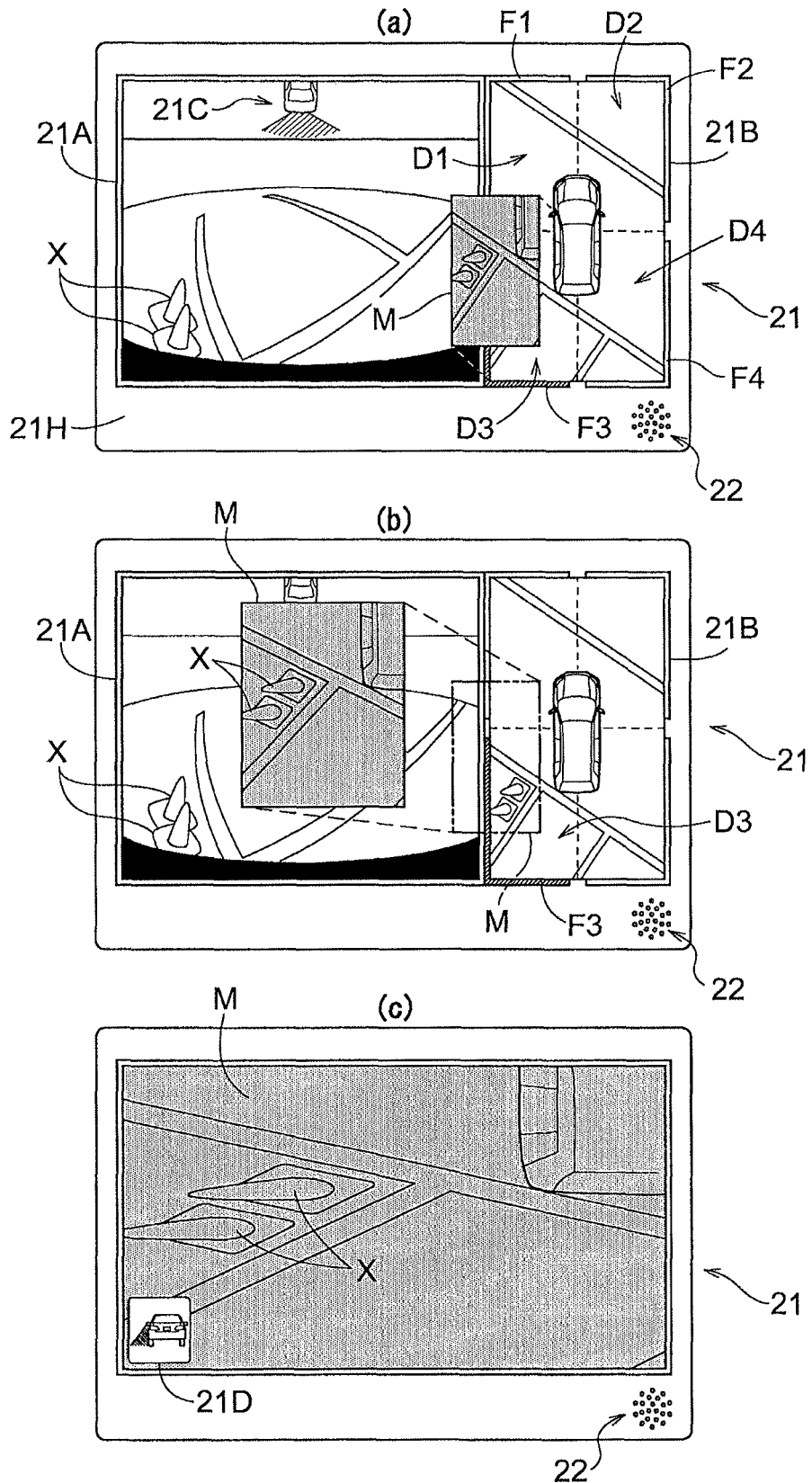
FIG. 8 is a continuous depiction of the process of enlarging the overhead image of a divided area to the entire screen of the monitor.

The parking assistance controller 37 displays an estimated route image Y (see FIG. 6(*a*)), which leads the vehicle 1 to a parking position, superimposed over the image displayed on the monitor 21 by the image processor 39. The driver can easily lead the vehicle 1 into the target parking position by performing the steering operation on the basis of the estimated route image Y displayed on the monitor 21.

Figure 5:
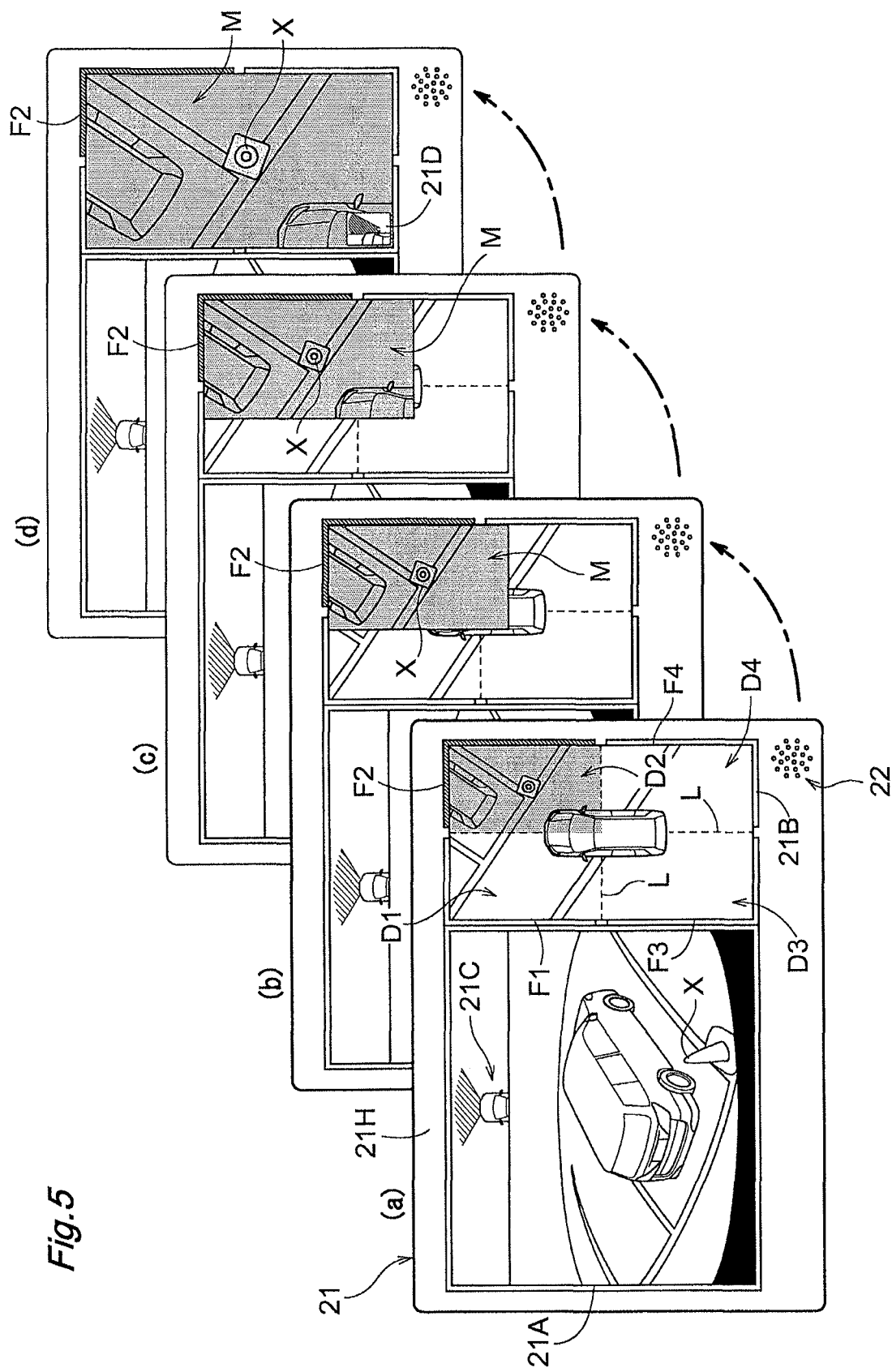
FIG. 5 is a continuous depiction of the process of enlarging the overhead image of a divided area to the auxiliary display area.

The image processor 39 disposes a primary display area 21A and an auxiliary display area 21B (an example of the overhead image display area) in the layout shown in FIG. 5(*a*) on the monitor 21 in the vehicle peripheral observation process, and displays a camera icon 21C showing the camera that captured the image of this area in a position in the top of the primary display area 21A.

The image processor 39 comprises overhead-image-generating unit 39A for generating an overhead image in the format of looking down on the vehicle 1 from above from the images captured by the plurality of cameras previously described; divided area management unit 39B for dividing and managing the overhead image displayed on the monitor 21 into a plurality of divided areas D1 to D4; specified information output unit 39C for displaying an emphasized frame F corresponding to the divided area D containing the obstacle X from among a plurality of frames F1 to F4, the frame F being information specifying which area of the plurality of divided areas D1 to D4 displays the obstacle X; enlarge mode setting unit 39D for setting an image to be enlarged and an enlarged display area; and enlarged display unit 39E for enlarging the image to be enlarged to the enlarged display area. As shown in FIG. 5(a), the divided area D1 and the divided area D2 correspond to the left and right sides of the front part of the vehicle, while the divided area D3 and the divided area D4 correspond to the left and right sides of the rear part of the vehicle. Similarly, the frames F1 to F4 correspond to the divided areas D1 to D4 as shown in the drawings. The divided area D is used as a broader term for the divided areas D1 to D4, and the frame F is used as a broader term for the frames F1 to F4.

The ECU 30 is configured from an electronic circuit, and some or the entirety of the interface or output system may be included in this electronic circuit. The ECU 30 has either an electronic circuit constituting a processing system, or a storage part configured by a memory, register, or the like as a separate component; and information is inputted and outputted by a database, an address bus, a control bus, and other components.

The sensor input interface 31 receives input of driving operation information and information for detecting the movement state from the steering sensor S16, the shift position sensor S19, the acceleration sensor S17, the brake sensor S18, and the movement distance sensor S3.

The communication interface 32 conducts communication between the power steering unit PS, the speed change mechanism T, the braking devices BK, and the GPS unit 41 via communication lines. Furthermore, the communication interface 32 acquires information from the touch panel 21T, the left side camera 25, the right side camera 26, the front camera 27, and the rear camera 28.

The image output module 33 outputs images to the monitor 21, and the audio output module 34 outputs audio to the speaker 22.

[Control Format]

Figure 4:
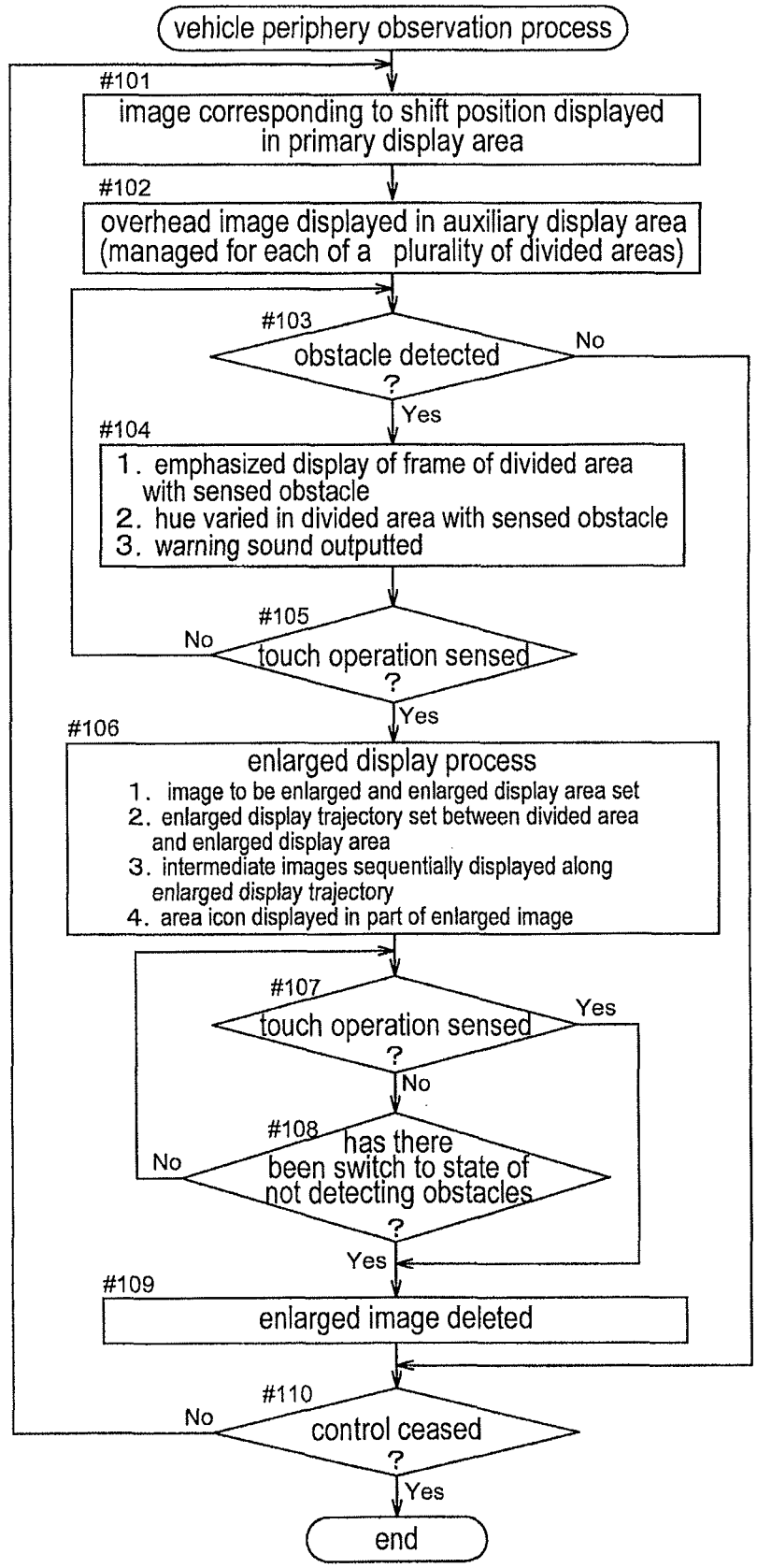
FIG. 4 is a flowchart of the vehicle periphery observation process.

A format of the vehicle peripheral observation display process is shown in the flowchart of FIG. 4, and the content displayed in the monitor 21 when this process is executed is shown in FIGS. 5 to 8.

In other words, when the shift lever 19 is placed in the forward position in a state in which the vehicle peripheral observation process has been selected, the image captured using the front camera 27 is displayed on the primary display area 21A as shown in FIG. 5(a). The camera icon 21C, which shows that the image is the image captured using the front camera 27, is displayed in a position in the top part of the primary display area 21A, and an overhead image is displayed in the auxiliary display area 21B. Conversely, when the shift lever 19 is placed in the reverse position, the image captured using the rear camera 28 is displayed in the primary display area 21A as shown in FIG. 6(a). The camera icon 21C, which shows that the image is the image captured using the rear camera 28, is displayed in a position in the top part of the primary display area 21A, and an overhead image is displayed in the auxiliary display area 21B (steps #101 and #102).

A specific format of the process is that when the shift lever 19 has been placed in the forward position, the image captured using the front camera 27 is displayed in the primary display area 21A. When the shift lever 19 has been placed in the rear position, the image captured using the rear camera 28 is acquired, a mirror reflection image interchanging the left and right of this captured image is generated, and the image is displayed on the monitor 21.

The overhead image displayed in the auxiliary display area 21B is generated as a single overhead image disposed on the road surface by the overhead-image-generating unit 39A acquiring the images captured using the left side camera 25, the right side camera 26, the front camera 27, and the rear camera 28, converting the images to projected images in the format of looking down from above, and mapping the projected images in an imaginary plane in a position encompassing the vehicle image.

The overhead image displayed in this manner is divided and managed as four divided areas D1 to D4 so as to be sectioned by sectioning lines L shown as dashed lines. The sectioning lines L shown in the drawing are not displayed on the screen, but the process format may be set so that the sectioning lines L are displayed on the screen.

Particularly, the overhead image displayed in the auxiliary display area 21B is generated from the images captured using four cameras, but the respective overhead images of the four divided areas D1 to D4 sectioned by the sectioning lines L are generated by combining the images captured using two cameras. In other words, overlapping areas W (see FIG. 1) in the images captured using two cameras are formed in outer positions at the front and rear corners of the vehicle 1, and the images are combined so that the border regions in the overlapping areas W do not stand out. When the overhead image combined in this manner is set as the image to be enlarged, the overhead image is enlarged to the size of the enlarged display area.

When the shift lever 19 has been placed in the reverse position, it is possible to execute parking assistance control as well, and when parking assistance control is thus executed, an estimated route image Y is displayed superimposed over the primary display area 21A and the auxiliary display area 21B as shown in FIG. 6(a).

The estimated route image Y represents the route the vehicle 1 will traverse when the vehicle 1 is reversed with the current steering amount, and the estimated route image Y is generated in an imaginary plane coinciding with the road surface with a sense of perspective corresponding to the captured image displayed on the monitor 21. The estimated route image is formed in a frame by a pair of vehicle width lines Ya forming a width equal to the width of the vehicle 1, and a plurality of distance lines Yb showing the positions the vehicle 1 will reach upon reversing in the set amount.

The obstacle detector 38 previously described is configured as software for extracting, as an obstacle X, a three-dimensional object that produces a parallax from the images of the overlapping areas W that overlap in the imaging areas of the left side camera 25, the right side camera 26, the front camera 27, and the rear camera 28. A summary of the process for extracting the three-dimensional object can be described as follows. In other words, the image of an overlapping area W in the images captured using two cameras is projected and converted to an imaginary plane having the same background, and the two images that have been projected and converted are superimposed in a positional relationship such that the same backgrounds of the images coincide. The image that does not coincide during this superimposing is the three-dimensional object, the three-dimensional object is estimated to be an obstacle X, and the position of the obstacle X is specified.

The overlapping area W of the imaging area of the two cameras could also be in a blind spot for the driver, and it is rational that only the obstacle X in this area be the object of detection. The vehicle may have four or more cameras in order to enlarge the area of detection for the obstacle X. Furthermore, the obstacle detector 38 may be configured as software for detecting the obstacle X by an optical-flow technique.

Particularly, the obstacle detector 38 may comprise an ultrasonic sensor or other obstacle sensors in a plurality of locations in the vehicle 1, such as the front end and rear end. Configuring the obstacle detector 38 using obstacle sensors in order to detect obstacles X in this manner makes it possible to detect obstacles X in the entire periphery around the vehicle 1.

When an obstacle X is detected by the obstacle detector 38, and specifically when, among the divided areas D1 to D4, the obstacle X is in the divided area D2 as shown in FIG. 5, the divided area D2 (the divided area D that includes the detected obstacle X) is indicated, and the display of the frame F2 in the outer periphery of the divided area D2 is emphasized (shown in hatching in the drawing). At the same time, the color tone of the divided area D2 containing the obstacle X is varied, and a warning sound is outputted from the speaker 22 (steps #103 and 104). The color tone of D2 need not be varied. In this case, it is acceptable to vary the color tone of only the intermediate image.

In this process, the display is emphasized in the divided area D2 containing the obstacle X from among the divided areas D1 to D4 managed by the divided area management unit 39B, by the specified information output unit 39C increasing the brightness of the frame F2, increasing the chroma, or varying the frame to a different hue. In addition to this emphasized display, the display of the frame F2 may be varied so as to blink. One possibility for the process of varying the color tone of the divided area D2 containing the obstacle X to a different color tone is a process of increasing the brightness or reducing the brightness of one of the three primary colors, blue (B), of the pixels of the image in the divided area D2, for example. Furthermore, the warning sound outputted from the speaker 22 need not be an electronic sound, and may be a worded message.

Next, when there is sensed a touch operation of the driver's fingers or the like touching the auxiliary display area 21B, the touch operation is a trigger for the image (the overhead image or image captured using the camera) of the divided area D2 already indicated to be used as the image to be enlarged, and an enlarge process is performed for enlarging the image to be enlarged to the enlarged display area (steps #105 and #106).

In this process, the enlarged display unit 39E executes an enlarge process in accordance with the enlarge mode set by the enlarge mode setting unit 39D. An image to be enlarged and an enlarged display area are set in this enlarge mode. Set as the image to be enlarged is either the overhead image displayed in the divided area D2 containing the obstacle X, or the image captured by one of the cameras that has imaged the obstacle X (the image as viewed from the camera). One of the following modes is set: a normal enlarge mode for setting the auxiliary display area 21B as the enlarged display area, a separate screen enlarge mode for setting the primary display area 21A as the enlarged display area, or an entire screen enlarge mode for setting the entire screen of the monitor 21 as the enlarged display area.

The procedure for setting the enlarge mode may consist of a mode setting screen being displayed on the monitor 21 and the mode being set in advance manually.

[Control Format: Normal Enlarge Mode]

When the enlarge process is performed in normal enlarge mode, the enlarged display unit 39E sets the image to be enlarged (the overhead image of the divided area D in the drawing), sets the auxiliary display area 21B shown in FIGS. 5 and 6 as the enlarged display area, and sets an enlarged display trajectory (not shown) between the divided area D2-D3 (meaning D2 in FIG. 5 and divided area D3 in FIG. 6) and the enlarged display area (the auxiliary display area 21B).

Next, the image of the divided area D2-D3 (an overhead image) is enlarged as shown in FIGS. 5(b) and 6(b), thereby generating an intermediate image M slightly larger in size than the divided area D2-D3, and the intermediate image M is displayed superimposed over the overhead image of the auxiliary display area 21B in a position covering the entire divided area D2-D3 (the divided area D set by the presence of the obstacle X) which acts as a display origin point. The image of the divided area D2-D3 (an overhead image) is then immediately further enlarged as shown in FIGS. 5(c) and 6(c), whereby an intermediate image M of a larger size is formed and displayed in a position conforming to the enlarged display trajectory. In this case, a process is performed for deleting the previously displayed intermediate image M and displaying the next intermediate image M, and in normal enlarge mode, the next intermediate image M is displayed superimposed over the overhead image of the auxiliary display area 21B in a positional relationship of covering the entire intermediate image M that was previously displayed.

As the size of the intermediate image M is gradually moved along the enlarged display trajectory, intermediate images M of progressively larger sizes are displayed. The enlarged display is executed for a duration of about 0.5 seconds or 1 second, for example, and ultimately an enlarged image consisting of an enlargement of the image (overhead image) of the divided area D2-D3 fills up the area of the auxiliary display area 21B as shown in FIGS. 5(d) and 6(d). An area icon 21D is then displayed in the corner of the enlarged image, thereby completing the enlarge process. Particularly, the area icon 21D is set to a shape showing the area imaged by the camera and a size that does not overlap the road surface (a size that overlaps the vehicle image), and the original position of the image to be enlarged can be recognized from the area icon 21D.

[Control Format: Separate Screen Enlarge Mode]

When the enlarge process is performed in separate screen enlarge mode, the enlarged display unit 39E sets the image to be enlarged (the overhead image of the divided area D3 in FIG. 7), sets the primary display area 21A as the enlarged display area, and sets an enlarged display trajectory (not shown) between the divided area D3 and the enlarged display area (the primary display area 21A). In this control format as well, the color tone of the divided area D3 containing the obstacle X is varied and the display of the frame F3 in the outer periphery is emphasized (shown in hatching in the drawing).

Next, the image (an overhead image) of the divided area D3 is enlarged as shown in FIG. 7(a), thereby generating an intermediate image M slightly larger in size than the divided area D3, and the intermediate image M is displayed superimposed in a position covering much of the display area D3 (the divided area D set by the presence of the obstacle X) which acts as a display origin point. The image of the divided area D3 (an overhead image) is then immediately further enlarged as shown in FIG. 7(b), whereby an intermediate image M of a larger size is formed and displayed in a position conforming to the enlarged display trajectory.

As the size of the intermediate image M is gradually moved along the enlarged display trajectory, intermediate images M of progressively larger sizes are displayed. The enlarged display is executed for a duration of about 0.5 seconds or 1 second, for example, and ultimately an enlarged image consisting of an enlargement of the image (overhead image) of the divided area D3 fills up the area of the primary display area 21A as shown in FIG. 7(c). An area icon 21D is then displayed in the corner of the enlarged image, thereby completing the enlarge process. Particularly, the area icon 21D has a shape showing the area imaged by the camera, and the original position of the image to be enlarged can be recognized from the area icon 21D.

In separate screen enlarge mode, because the enlarged display area (the primary display area 21A) and the divided area D3 have different aspect ratios, there is a deformation of the enlarged image in which the overhead image of the divided area D3 fills up the area of the primary display area 21A. The display may also have the top and bottom ends of the enlarged image trimmed off while the area displaying the obstacle X remains.

[Control Format: Entire Screen Enlarge Mode]

When the enlarge process is performed in entire screen enlarge mode, the enlarged display unit 39E sets the image to be enlarged (the overhead image of the divided area D3 in FIG. 8), sets the display area of the monitor 21 as the enlarged display area, and sets an enlarged display trajectory (not shown) between the divided area D3 and the enlarged display area (the display area of the monitor 21). In this control format as well, the color tone of the divided area D3 containing the obstacle X is varied and the display of the frame F3 in the outer periphery is emphasized (shown in hatching in the drawing).

Next, the image (an overhead image) of the divided area D3 is enlarged as shown in FIG. 8(a), thereby generating an intermediate image M slightly larger in size than the divided area D3, and the intermediate image M is displayed superimposed in a position covering much of the display area D3 (the divided area D set by the presence of the obstacle X) which acts as a display origin point. The image of the divided area D3 (an overhead image) is then immediately further enlarged as shown in FIG. 8(b), whereby an intermediate image M of a larger size is formed and displayed in a position conforming to the enlarged display trajectory.

As the size of the intermediate image M is gradually moved along the enlarged display trajectory, intermediate images M of progressively larger sizes are displayed. The enlarged display is executed for a duration of about 0.5 seconds or 1 second, for example, and ultimately an enlarged image consisting of an enlargement of the image (overhead image) of the divided area D3 fills up the display area of the monitor 21 as shown in FIG. 8(c). An area icon 21D is then displayed in the corner of the enlarged image, thereby completing the enlarge process. Particularly, the area icon 21D has a shape showing the area imaged by the camera, and the original position of the image to be enlarged can be recognized from the area icon 21D.

In entire screen enlarge mode, because the enlarged display area (the display area of the monitor 21) and the divided area D3 have different aspect ratios, there is a deformation of the enlarged image in which the overhead image of the divided area D3 fills up the display area of the monitor 21. The display may also have the top and bottom ends of the enlarged image trimmed off while the area displaying the obstacle X remains.

Regardless of which enlarge mode the enlarge process is performed in, the image is enlarged in a format of moving the display position of the intermediate image M along the enlarged display trajectory using the position of the divided area D as an origin point (the position of the corner of the intermediate image M does not move in normal enlarge mode of FIGS. 5 and 6), and enlargement in a zoomed-in format is achieved while the position of the original image being enlarged (the position of the divided area D) is clarified. It is then possible to recognize which area the enlarged image belongs to, from the format of the area icon 21D displayed in the corner of the enlarged image or from the display position of the area icon 21D.

A superimposed display is implemented by performing the process for forming intermediate images M in a movie layer when the enlarge process is performed in either enlarge mode, and while this superimposed display is in effect, changes in the positional relationship between the vehicle 1 and the obstacle X can be displayed in real time using either overhead images or captured images. As will be described next, the process is finished by deleting the enlarged image and deleting the video layer image even when the original display is to be restored.

Next, when there is sensed a touch operation of the driver's fingers or the like touching any area of the monitor 21, or when a state is reached in which no obstacle X is detected by the obstacle detector 38, the enlarged image is deleted and the sequence transitions to the process of step #101, thereby resuming control in which a captured image is displayed in the primary display area 21A of the monitor 21 and an overhead image is displayed in the auxiliary display area 21B (steps #107 to #109).

The vehicle peripheral observation display process is then continued until a selection is made for ceasing control (step #110).

Thus, in the present invention, when the vehicle 1 is being led into a parking position, or when the vehicle 1 is traversing a road surface in which a fence, a parked vehicle, or another obstacle X is present, a image captured by a camera is displayed in the primary display area 21A of the monitor 21, and an overhead image is displayed in the auxiliary display area 21B of the monitor 21. The positional relationship between the vehicle 1 and an obstacle X in proximity to the vehicle can thereby be confirmed even when the obstacle X is in the driver's blind spot.

When the vehicle is in proximity to an obstacle X, an emphasized display is performed, increasing the brightness of the frame F among the frames F1 to F4 that corresponds to the outer periphery of the divided area D containing the obstacle X among the divided areas D1 to D4 of the overhead image. At the same time as this display, a display is performed for varying the color tone of the divided area D containing the obstacle X and a warning sound is outputted from the speaker 22, whereby the area containing the obstacle X can be perceived.

By touching the auxiliary display area 21B with the finger or the like in this state of being able to perceive the position of the obstacle X, the divided area D containing the obstacle X among the divided areas D1 to D4 is enlarged to the enlarged display area, and the positional relationship between the obstacle X and the vehicle 1 can be confirmed in the enlarged image.

Particularly, when the image of any of the plurality of divided areas D1 to D4 is enlarged to the enlarged display area, display is performed in a format such that, using the divided area D containing the obstacle X as an origin point, a plurality of intermediate images M of different sizes are moved sequentially along the enlarged display trajectory so as to transition from smaller sized images to larger sized images. By enlarging in this manner, an enlargement is implemented in a format of zooming in while clarifying the position of the original image being enlarged (the position of the divided area D containing the obstacle X).

As a result of the enlarged display of either the overhead image of the area containing the obstacle X or the image captured using the camera that imaged the obstacle X, the positional relationship between the obstacle X and the vehicle 1 can be perceived from the enlarged image, and the vehicle 1 can be moved in a manner that avoids contact with the obstacle X.

[Other Embodiments]

Other than the embodiments described above, the present invention may also be configured in the following manner.

(a) When the overhead image is divided into and managed as a plurality of divided areas D, it may be divided into and managed as a number of divisions other than four, such as two or six divisions. The configuration may allow the user to set the number of divisions as desired. When the division is a large number, the proximity of the obstacle X to local areas in the periphery of the vehicle 1 can be confirmed, and the region of the obstacle can be enlarged and displayed.

(b) The operation for executing the enlarge process of enlarging the image of the divided area D containing the obstacle X may be setting the control format so that the enlarge process is initiated even if a finger or the like touches any location of the display area of the monitor 21, or the operation may be an enlarge button or the like for initiating the enlarge process, displayed on the monitor 21. Similarly, a designated button for ending the enlarged display may be displayed on the monitor 21.

(c) When an image to be enlarged is set in the enlarge process by the enlarge mode setting unit 39D and when an obstacle X is detected in front of the vehicle 1 (when there is an obstacle X in a divided area D in front of the vehicle), an overhead image is set as the image to be enlarged. Conversely, when an obstacle X is detected behind the vehicle 1 (when there is an obstacle X in a divided area D behind the vehicle), an image captured by a camera is set as the image to be enlarged.

This is because when there is an obstacle X in front of the vehicle 1, the driver will sometimes lean out of the vehicle to visually confirm the obstacle, and it is effective for the obstacle X thus visually confirmed to be displayed as seen from a different direction than an obstacle X that could be seen by the driver, which is made possible by setting an overhead image as the image to be enlarged. When there is an obstacle X behind the vehicle 1, the obstacle often cannot be seen by the driver, and it is effective for the image to be enlarged to be a captured image that gives the sense of looking directly at the image captured by a camera.

(d) When an image to be enlarged is set in the enlarge process by the enlarge mode setting unit 39D, and when the configuration is such that the height of the obstacle X can be measured by the obstacle detector 38 and the height exceeds a set value (when it is comparatively high), the image captured by a camera is set as the image to be enlarged so that the height can be recognized. Conversely, when the height is less than the set value (when it is comparatively low), an overhead image is set as the image to be enlarged because there is no need to recognize the height. The height of the obstacle X can be easily perceived by selecting the image to be enlarged in this manner.

(e) In the previous other embodiments (c) and (d), when a image captured by a camera is used as the image to be enlarged and when the operated direction of the steering wheel 16 is determined to be the forward direction of the vehicle 1 and a direction approaching the obstacle X, a image captured using a side camera (the left side camera 25 or the right side camera 26) is set as the image to be displayed. When the forward direction of the vehicle 1 is determined to be a direction going away from the obstacle X, an image captured by a camera in an end of the vehicle 1 (the front camera 27 or the rear camera 28) is set as the image to be displayed.

By selecting the camera that acquires the captured image on the basis of the steering direction in this manner, changes in the relative positional relationship between the obstacle X and the vehicle 1 can easily be perceived from the image captured using a side camera (the left side camera 25 or the right side camera 26), even when the vehicle 1 has moved somewhat in a direction approaching the obstacle X. When the vehicle 1 moves in a direction going away from the obstacle X, a wide area in the forward direction of the vehicle 1 can be displayed on the monitor 21 and the forward direction can be confirmed from an image captured by a camera in an end of the vehicle 1.

(f) When it is detected that "the overhead image display area (the auxiliary display area) has been touched," it may either be a detection of a touching state change from a state of no touching of the touch panel 21T (the overhead image area) to a state of touching, or a detection of a state change from a state of a finger or the like touching the touch panel 21T (the overhead image area) to a state of the finger or the like taken away.

INDUSTRIAL APPLICABILITY

The present invention can be utilized in an entire vehicle having an image processing system for generating an overhead image from the images captured using a plurality of cameras provided to the vehicle and displaying the overhead image on a monitor.

KEY
1 Vehicle
21 Monitor
21B Overhead image display area (auxiliary display area)
21T Touch panel
25 Camera (left side camera)
26 Camera (right side camera)
27 Camera (front camera)
39 Image processor
39A Overhead-image-generating unit
39C Specified information output unit
39E Enlarged display unit
D Divided area
f Frame
M Intermediate image
X Obstacle

The invention claimed is:
1. A vehicle peripheral observation device comprising:
a plurality of cameras for imaging an area including a road surface of a vehicle periphery, an image processor for displaying the images captured using the plurality of cameras on a monitor;
and obstacle-detecting unit for detecting an obstacle in the vehicle periphery, wherein
the image processor is configured to show a display area for the captured images to be displayed on the monitor and provide a plurality of frames dividing the display area into sections, wherein the image processor is configured to emphasize at least one of the plurality of frames near an area where the obstacle that has been detected by the obstacle-detecting unit and included in the display area is present, wherein the emphasized frame has at least two line segments in a right angle arrangement and each line segment is displayed in a part of an outer rim of the section in the display area, and wherein the emphasized frame does not form an enclosed area.

2. The vehicle peripheral observation device according to claim 1, wherein the emphasized display increases the brightness of the frame or switches a hue of the frame to a different hue.

3. The vehicle peripheral observation device according to claim 1, wherein each of the plurality of frames is displayed in an outer periphery of the display area.

* * * * *